(12) United States Patent
Oinuma et al.

(10) Patent No.: US 10,914,921 B2
(45) Date of Patent: *Feb. 9, 2021

(54) CAMERA OPTICAL LENS

(71) Applicant: AAC OPTICS SOLUTIONS PTE. LTD., Singapore (SG)

(72) Inventors: Kenji Oinuma, Shenzhen (CN); Lei Zhang, Shenzhen (CN); Yanmei Wang, Shenzhen (CN); Yuanshan Cui, Shenzhen (CN)

(73) Assignee: AAC Optics Solutions Pte. Ltd. (SG)

( * ) Notice: Subject to any disclaimer, the term of this patent is extended or adjusted under 35 U.S.C. 154(b) by 100 days.

This patent is subject to a terminal disclaimer.

(21) Appl. No.: 16/010,498

(22) Filed: Jun. 17, 2018

(65) Prior Publication Data
US 2019/0243099 A1    Aug. 8, 2019

(30) Foreign Application Priority Data

Feb. 5, 2018  (CN) .......................... 2018 1 0108859
Feb. 5, 2018  (CN) .......................... 2018 1 0108868

(51) Int. Cl.
*G02B 13/00* (2006.01)
*G02B 9/62* (2006.01)
*G02B 1/04* (2006.01)

(52) U.S. Cl.
CPC ........... *G02B 13/0045* (2013.01); *G02B 9/62* (2013.01); *G02B 1/041* (2013.01)

(58) Field of Classification Search
CPC .............................. G02B 13/0045; G02B 9/62
USPC .......................................... 359/713, 756–760
See application file for complete search history.

(56) References Cited

U.S. PATENT DOCUMENTS

| 4,260,223 A * | 4/1981 | Hamanishi ............... G02B 9/08 359/740 |
| 5,513,046 A * | 4/1996 | Toyama ................... G02B 9/62 359/752 |
| 9,348,113 B2 * | 5/2016 | Tang ........................ G02B 9/64 |
| 10,139,598 B1 * | 11/2018 | Wang ................. G02B 13/0045 |
| 10,197,774 B1 * | 2/2019 | Teraoka ............. G02B 13/0045 |
| 10,215,957 B2 * | 2/2019 | Lee ..................... G02B 13/0045 |
| 10,317,645 B2 * | 6/2019 | Park ................... G02B 13/0045 |
| 10,495,853 B2 * | 12/2019 | Oinuma .................... G02B 9/62 |
| 2018/0074297 A1 * | 3/2018 | Lee .......................... G02B 9/62 |
| 2019/0331893 A1 * | 10/2019 | Oinuma .................... G02B 9/62 |

OTHER PUBLICATIONS

Lohmann, Adolf W. "Scaling Laws for Lens Systems." Applied Optics, vol. 28, No. 23, Dec. 1, 1989, pp. 4996-4998.*

* cited by examiner

*Primary Examiner* — Zachary W Wilkes
(74) *Attorney, Agent, or Firm* — IPro, PLLC; Na Xu

(57) ABSTRACT

The present disclosure discloses a camera optical lens, including, in an order from an object side to an image side, a first lens, a second lens, a third lens, a fourth lens, a fifth lens, and a sixth lens. The first lens is made of plastic material, the second lens is made of plastic material, the third lens is made of plastic material, the fourth lens is made of plastic material, the fifth lens is made of plastic material, and the sixth lens is made of glass material. The camera optical lens further satisfies specific conditions.

21 Claims, 9 Drawing Sheets

CAMERA OPTICAL LENS

FIELD OF THE PRESENT DISCLOSURE

The present disclosure relates to optical lens, in particular to a camera optical lens suitable for handheld devices such as smart phones and digital cameras and imaging devices.

DESCRIPTION OF RELATED ART

With the emergence of smart phones in recent years, the demand for miniature camera lens is increasing day by day, but the photosensitive devices of general camera lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera lens with good imaging quality therefor has become a mainstream in the market. In order to obtain better imaging quality, the lens that is traditionally equipped in mobile phone cameras adopts a three-piece or four-piece lens structure. And, with the development of technology and the increase of the diverse demands of users, and under this circumstances that the pixel area of photosensitive devices is shrinking steadily and the requirement of the system for the imaging quality is improving constantly, the five-piece, six-piece and seven-piece lens structure gradually appear in lens design. There is an urgent need for ultra-thin wide-angle camera lenses which have good optical characteristics and the chromatic aberration of which is fully corrected.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
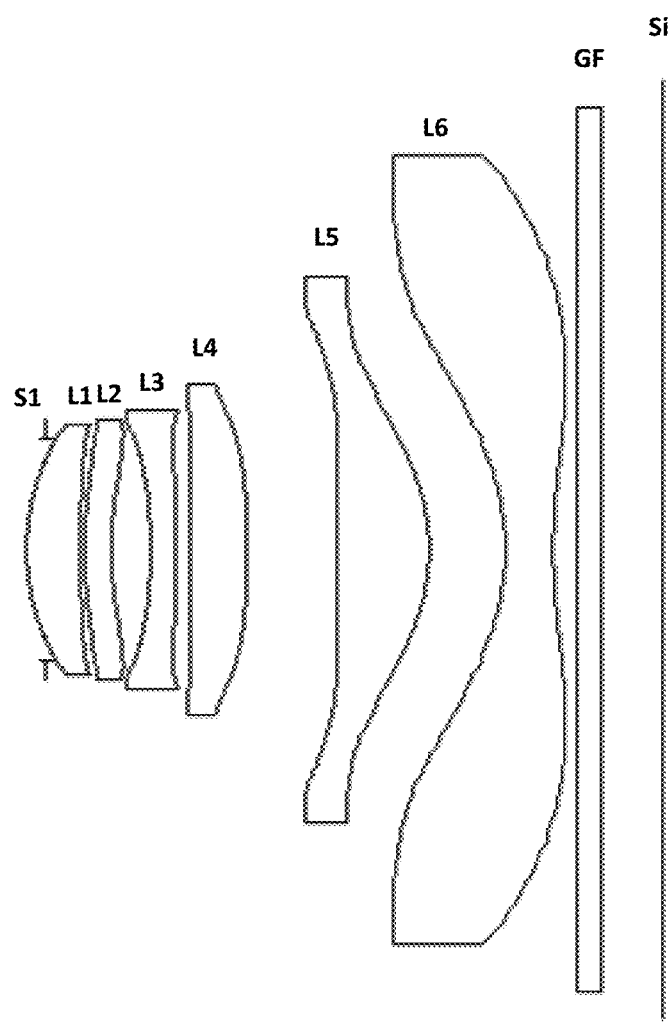
FIG. 1 is a schematic diagram of a camera optical lens in accordance with a first embodiment of the present invention.

As referring to FIG. 1, the present invention provides a camera optical lens 10. FIG. 1 shows the camera optical lens 10 of embodiment 1 of the present invention, the camera optical lens 10 comprises 6 lenses. Specifically, from the object side to the image side, the camera optical lens 10 comprises in sequence: an aperture S1, a first lens L1, a second lens L2, a third lens L3, a fourth lens L4, a fifth lens L5, and a sixth lens L6. Optical element like optical filter GF can be arranged between the sixth lens L6 and the image surface Si. The first lens L1 is made of plastic material, the second lens L2 is made of plastic material, the third lens L3 is made of plastic material, the fourth lens L4 is made of plastic material, the fifth lens L5 is made of plastic material, and the sixth lens L6 is made of glass material.

Here, the focal length of the whole camera optical lens 10 is defined as f, the focal length of the first lens is defined as f1. The camera optical lens 10 further satisfies the following condition: $0.1 \leq f1/f \leq 5$. Condition $0.1 \leq f1/f \leq 5$ fixes the positive refractive power of the first lens L1. If the upper limit of the set value is exceeded, although it benefits the ultra-thin development of lenses, but the positive refractive power of the first lens L1 will be too strong, problem like aberration is difficult to be corrected, and it is also unfavorable for wide-angle development of lens. On the contrary, if the lower limit of the set value is exceeded, the positive refractive power of the first lens L1 becomes too weak, it is then difficult to develop ultra-thin lenses. Preferably, the following condition shall be satisfied, $0.508 \leq f1/f \leq 3.123$.

The refractive index of the sixth lens L6 is defined as n6. Here the following condition should satisfied: $1.7 \leq n6 \leq 2.2$. This condition fixes the refractive index of the sixth lens L6, and refractive index within this range benefits the ultra-thin development of lenses, and it also benefits the correction of aberration. Preferably, the following condition shall be satisfied, $1.706 \leq n6 \leq 2.0$.

The thickness on-axis of the sixth lens L6 is defined as d11, and the total optical length of the camera optical lens 10 is defined as TTL. The following condition: $0.03 \leq d11/TTL \leq 0.15$ should be satisfied. This condition fixes the ratio between the thickness on-axis of the sixth lens L6 and the total optical length TTL. When the condition is satisfied, it is beneficial for realization of the ultra-thin lens. Preferably, the condition $0.04 \leq d11/TTL \leq 0.113$ shall be satisfied.

In this embodiment, the first lens L1 has a positive refractive power with a convex object side surface relative to the proximal axis and a concave image side surface relative to the proximal axis.

The curvature radius of the object side surface of the first lens L1 is defined as R1, the curvature radius of the image side surface of the first lens L1 is defined as R2. The camera optical lens 10 further satisfies the following condition: $-3.70 \leq (R1+R2)/(R1-R2) \leq -0.70$, which fixes the shape of the first lens L1. When the value is beyond this range, with the development into the direction of ultra-thin and wide-angle lenses, problem like aberration of the off-axis picture angle is difficult to be corrected. Preferably, the condition $-2.31 \leq (R1+R2)/(R1-R2) \leq -0.88$ shall be satisfied.

The thickness on-axis of the first lens L1 is defined as d1. The following condition: $0.22 \leq d1 \leq 0.77$ should be satisfied. When the condition is satisfied, it is beneficial for realization of the ultra-thin lens. Preferably, the condition $0.35 \leq d1 \leq 0.62$ shall be satisfied.

In this embodiment, the second lens L2 has a negative refractive power with a convex object side surface relative to the proximal axis and a concave image side surface relative to the proximal axis.

The focal length of the whole camera optical lens 10 is f, the focal length of the second lens L2 is f2. The following condition should be satisfied: $-22.35 \leq f2/f \leq -1.83$. When the condition is satisfied, the negative refractive power of the second lens L2 is controlled within reasonable scope, the spherical aberration caused by the first lens L1 which has positive refractive power and the field curvature of the system then can be reasonably and effectively balanced. Preferably, the condition $-13.97 \leq f2/f \leq -2.29$ should be satisfied.

The curvature radius of the object side surface of the second lens L2 is defined as R3, the curvature radius of the image side surface of the second lens L2 is defined as R4. The following condition should be satisfied: $1.83 \leq (R3+R4)/(R3-R4) \leq 23.50$, which fixes the shape of the second lens L2 and can effectively correct aberration of the camera optical lens. Preferably, the following condition shall be satisfied, $2.93 \leq (R3+R4)/(R3-R4) \leq 18.80$.

The thickness on-axis of the second lens L2 is defined as d3. The following condition: $0.11 \leq d3 \leq 0.35$ should be satisfied. When the condition is satisfied, it is beneficial for realization of the ultra-thin lens. Preferably, the condition $0.18 \leq d3 \leq 0.28$ shall be satisfied.

In this embodiment, the third lens L3 has a negative refractive power with a concave object side surface and a convex image side surface relative to the proximal axis.

The focal length of the whole camera optical lens 10 is f, the focal length of the third lens L3 is f3. The following condition should be satisfied: $-8.39 \leq f3/f \leq -1.50$, by which the field curvature of the system then can be reasonably and effectively balanced. Preferably, the condition $-5.24 \leq f3/f \leq -1.87$ should be satisfied.

The curvature radius of the object side surface of the third lens L3 is defined as R5, the curvature radius of the image side surface of the third lens L3 is defined as R6. The following condition should be satisfied: $-4.59 \leq (R5+R6)/(R5-R6) \leq -1.23$, which is beneficial for the shaping of the third lens L3, and bad shaping and stress generation due to extra large curvature of surface of the third lens L3 can be avoided. Preferably, the following condition shall be satisfied, $-2.87 \leq (R5+R6)/(R5-R6) \leq -1.54$.

The thickness on-axis of the third lens L3 is defined as d5. The following condition: $0.11 \leq d5 \leq 0.35$ should be satisfied. When the condition is satisfied, it is beneficial for realization of the ultra-thin lens. Preferably, the condition $0.17 \leq d5 \leq 0.28$ shall be satisfied.

In this embodiment, the fourth lens L4 has a positive refractive power with a convex object side surface relative to the proximal axis.

The focal length of the whole camera optical lens 10 is f, the focal length of the fourth lens L4 is f4. The following condition should be satisfied: $1.07 \leq f4/f \leq 32.70$, which can effectively reduce the sensitivity of lens group used in camera and further enhance the imaging quality. Preferably, the condition $1.71 \leq f4/f \leq 26.16$ should be satisfied.

The curvature radius of the object side surface of the fourth lens L4 is defined as R7, the curvature radius of the image side surface of the fourth lens L4 is defined as R8. The following condition should be satisfied: $-12.06 \leq (R7+R8)/(R7-R8) \leq -0.32$, by which, with the development into the direction of ultra-thin and wide-angle lenses, problem like aberration of the off-axis picture angle is difficult to be corrected. Preferably, the following condition shall be satisfied, $-7.54 \leq (R7+R8)/(R7-R8) \leq -0.40$.

The thickness on-axis of the fourth lens L4 is defined as d7. The following condition: $0.23 \leq d7 \leq 0.84$ should be satisfied. When the condition is satisfied, it is beneficial for realization of the ultra-thin lens. Preferably, the condition $0.37 \leq d7 \leq 0.67$ shall be satisfied.

In this embodiment, the fifth lens L5 has a positive refractive power with a convex object side surface and a convex image side surface relative to the proximal axis.

The focal length of the whole camera optical lens 10 is f, the focal length of the fifth lens L5 is f5. The following condition should be satisfied: $0.34 \leq f5/f \leq 1.03$, which can effectively smooth the light angles of the camera and reduce the tolerance sensitivity. Preferably, the condition $0.54 \leq f5/f \leq 0.82$ should be satisfied.

The curvature radius of the object side surface of the fifth lens L5 is defined as R9, the curvature radius of the image side surface of the fifth lens L5 is defined as R10. The following condition should be satisfied: $0.26 \leq (R9+R10)/(R9-R10) \leq 1.12$, by which, the shape of the fifth lens L5 is fixed, further, with the development into the direction of ultra-thin and wide-angle lenses, problem like aberration of the off-axis picture angle is difficult to be corrected. Preferably, the following condition shall be satisfied, $0.41 \leq (R9+R10)/(R9-R10) \leq 0.90$.

The thickness on-axis of the fifth lens L5 is defined as d9. The following condition: $0.36 \leq d9 \leq 1.14$ should be satisfied. When the condition is satisfied, it is beneficial for realization of the ultra-thin lens. Preferably, the condition $0.57 \leq d9 \leq 0.91$ shall be satisfied.

In this embodiment, the sixth lens L6 has a negative refractive power with a concave object side surface and a concave image side surface relative to the proximal axis.

The focal length of the whole camera optical lens 10 is f, the focal length of the sixth lens L6 is f6. The following condition should be satisfied: $-0.94 \leq f6/f \leq -0.31$, which can effectively reduce the sensitivity of lens group used in camera and further enhance the imaging quality. Preferably, the condition $-0.59 \leq f6/f \leq -0.38$ should be satisfied.

The curvature radius of the object side surface of the sixth lens L6 is defined as R11, the curvature radius of the image side surface of the sixth lens L6 is defined as R12. The following condition should be satisfied: $-1.25 \leq (R11+R12)/(R11-R12) \leq -0.26$, by which, the shape of the sixth lens L6 is fixed, further, with the development into the direction of ultra-thin and wide-angle lenses, problem like aberration of the off-axis picture angle is difficult to be corrected. Preferably, the following condition shall be satisfied, $-0.78 \leq (R11+R12)/(R11-R12) \leq -0.33$.

The thickness on-axis of the sixth lens L6 is defined as d11. The following condition: $0.13 \leq d11 \leq 0.59$ should be satisfied. When the condition is satisfied, it is beneficial for realization of the ultra-thin lens. Preferably, the condition $0.21 \leq d11 \leq 0.47$ shall be satisfied.

The focal length of the whole camera optical lens 10 is f, the combined focal length of the first lens L1 and the second lens L2 is f12. The following condition should be satisfied: $0.63 \leq f12/f \leq 2.01$, which can effectively avoid the aberration and field curvature of the camera optical lens, and can suppress the rear focal length for realizing the ultra-thin lens. Preferably, the condition $1.00 \leq f12/f \leq 1.61$ should be satisfied.

In this embodiment, the total optical length TTL of the camera optical lens 10 is less than or equal to 5.72 mm, it is beneficial for the realization of ultra-thin lenses. Preferably, the total optical length TTL of the camera optical lens 10 is less than or equal to 5.46 mm.

In this embodiment, the aperture F number of the camera optical lens 10 is less than or equal to 2.27. A large aperture has better imaging performance. Preferably, the aperture F number of the camera optical lens 10 is less than or equal to 2.22.

With such design, the total optical length TTL of the whole camera optical lens 10 can be made as short as possible, thus the miniaturization characteristics can be maintained.

In the following, an example will be used to describe the camera optical lens 10 of the present invention. The symbols recorded in each example are as follows. The unit of distance, radius and center thickness is mm.

TTL: Optical length (the distance on-axis from the object side surface of the first lens L1 to the image surface).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in the first embodiment of the present invention is shown in the following, the unit of the focal length, distance, radius and center thickness is mm.

The design information of the camera optical lens 10 in the first embodiment of the present invention is shown in the tables 1 and 2.

TABLE 1

| | R | d | nd | vd |
|---|---|---|---|---|
| S1 | ∞ | d0= −0.160 | | |
| R1 | 2.004 | d1= 0.433 | nd1 1.5449 | v1 55.93 |
| R2 | 6.718 | d2= 0.038 | | |
| R3 | 3.235 | d3= 0.219 | nd2 1.6713 | v2 19.24 |
| R4 | 2.847 | d4= 0.321 | | |
| R5 | −4.297 | d5= 0.210 | nd3 1.6713 | v3 19.24 |
| R6 | −14.403 | d6= 0.105 | | |
| R7 | 6.244 | d7= 0.467 | nd4 1.5352 | v4 56.09 |
| R8 | −17.796 | d8= 0.734 | | |
| R9 | 11.582 | d9= 0.762 | nd5 1.5352 | v5 56.09 |
| R10 | −1.665 | d10= 0.619 | | |
| R11 | −2.062 | d11= 0.393 | nd6 1.7292 | v6 54.68 |
| R12 | 4.712 | d12= 0.189 | | |
| R13 | ∞ | d13= 0.210 | ndg 1.5168 | vg 64.17 |
| R14 | ∞ | d14= 0.500 | | |

Where:

In which, the meaning of the various symbols is as follows.

S1: Aperture;

R: The curvature radius of the optical surface, the central curvature radius in case of lens;

R1: The curvature radius of the object side surface of the first lens L1;

R2: The curvature radius of the image side surface of the first lens L1;

R3: The curvature radius of the object side surface of the second lens L2;

R4: The curvature radius of the image side surface of the second lens L2;

R5: The curvature radius of the object side surface of the third lens L3;

R6: The curvature radius of the image side surface of the third lens L3;

R7: The curvature radius of the object side surface of the fourth lens L4;

R8: The curvature radius of the image side surface of the fourth lens L4;

R9: The curvature radius of the object side surface of the fifth lens L5;

R10: The curvature radius of the image side surface of the fifth lens L5;

R11: The curvature radius of the object side surface of the sixth lens L6;

R12: The curvature radius of the image side surface of the sixth lens L6;

R13: The curvature radius of the object side surface of the optical filter GF;

R14: The curvature radius of the image side surface of the optical filter GF;

d: The thickness on-axis of the lens and the distance on-axis between the lens;

d0: The distance on-axis from aperture S1 to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 to the object side surface of the third lens L3;

d5: The thickness on-axis of the third lens L3;

d6: The distance on-axis from the image side surface of the third lens L3 to the object side surface of the fourth lens L4;

d7: The thickness on-axis of the fourth lens L4;

d8: The distance on-axis from the image side surface of the fourth lens L4 to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 to the object side surface of the optical filter GF;

d13: The thickness on-axis of the optical filter GF;

d14: The distance on-axis from the image side surface to the image surface of the optical filter GF;

nd: The refractive index of the d line;

nd1: The refractive index of the d line of the first lens L1;

nd2: The refractive index of the d line of the second lens L2;
nd3: The refractive index of the d line of the third lens L3;
nd4: The refractive index of the d line of the fourth lens L4;
nd5: The refractive index of the d line of the fifth lens L5;
nd6: The refractive index of the d line of the sixth lens L6;
ndg: The refractive index of the d line of the optical filter GF;
vd: The abbe number;
v1: The abbe number of the first lens L1;
v2: The abbe number of the second lens L2;
v3: The abbe number of the third lens L3;
v4: The abbe number of the fourth lens L4;
v5: The abbe number of the fifth lens L5;
v6: The abbe number of the sixth lens L6;
vg: The abbe number of the optical filter GF.

Table 2 shows the aspherical surface data of the camera optical lens 10 in the embodiment 1 of the present invention.

TABLE 3

| | Inflexion point number | Inflexion point position 1 | Inflexion point position 2 | Inflexion point position 3 |
|---|---|---|---|---|
| P1R1 | 0 | | | |
| P1R2 | 0 | | | |
| P2R1 | 1 | 1.025 | | |
| P2R2 | 1 | 0.605 | | |
| P3R1 | 1 | 0.975 | | |
| P3R2 | 1 | 0.645 | | |
| P4R1 | 3 | 0.355 | 1.005 | 1.085 |
| P4R2 | 1 | 1.215 | | |
| P5R1 | 2 | 0.415 | 1.825 | |
| P5R2 | 1 | 1.205 | | |
| P6R1 | 2 | 1.515 | 2.635 | |
| P6R2 | 1 | 0.765 | | |

TABLE 2

| | Conic Index | Aspherical Surface Index | | | | | | |
|---|---|---|---|---|---|---|---|---|
| | k | A4 | A6 | A8 | A10 | A12 | A14 | A16 |
| R1 | 2.8609E−01 | 4.6104E−03 | 5.5869E−03 | −1.4217E−02 | 1.6978E−02 | 1.1059E−03 | −9.6911E−03 | 7.0332E−03 |
| R2 | −1.4194E+02 | −1.7888E−02 | 4.0836E−03 | 1.7177E−02 | 1.1417E−02 | −8.0423E−04 | −9.0186E−03 | 9.2545E−03 |
| R3 | −1.9306E+01 | −4.1130E−02 | −1.1471E−02 | 2.1960E−02 | 1.9220E−02 | 1.0885E−03 | −8.9476E−03 | −2.3533E−03 |
| R4 | −9.7074E−01 | −5.4912E−02 | −3.2599E−02 | 2.2004E−03 | 1.0734E−02 | −7.0046E−03 | −7.2597E−03 | 6.8249E−03 |
| R5 | 1.3505E+01 | 2.6954E−03 | −5.6378E−03 | −1.1664E−02 | −3.7001E−03 | −5.4947E−03 | 4.1442E−03 | 1.6594E−02 |
| R6 | 1.1170E+02 | −4.0821E−02 | 5.5191E−02 | 1.4253E−02 | −1.6183E−02 | 6.1114E−03 | −3.5089E−03 | 2.4470E−03 |
| R7 | −3.6569E+01 | −1.0827E−01 | 4.5358E−02 | 2.6950E−03 | −1.0700E−03 | −2.6481E−04 | −5.0506E−04 | −2.0572E−04 |
| R8 | 1.1454E+02 | −7.1829E−02 | 2.1997E−03 | −4.9744E−03 | 4.6401E−03 | 7.3097E−06 | −2.0833E−04 | 1.7619E−04 |
| R9 | −1.3738E+02 | −3.8672E−02 | 1.2369E−02 | −3.1925E−03 | −5.7664E−05 | 4.9085E−05 | 2.6245E−05 | −4.0954E−06 |
| R10 | −6.3547E−01 | 2.9793E−02 | 5.7212E−03 | −6.0131E−04 | 2.4205E−04 | −3.5926E−05 | −6.2509E−06 | 1.1026E−06 |
| R11 | −3.7831E+00 | −2.4609E−02 | 5.5022E−03 | 1.5972E−04 | −6.3220E−05 | −6.0897E−06 | 1.5376E−06 | −7.5146E−08 |
| R12 | 8.2632E−01 | −3.8121E−02 | 4.0403E−03 | −2.5769E−04 | 1.9400E−05 | −6.3984E−06 | 8.1632E−07 | −3.2953E−08 |

Among them, K is a conic index, A4, A6, A8, A10, A12, A14, A16 are aspheric surface indexes.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, the aspheric surface of each lens surface uses the aspheric surfaces shown in the above condition (1). However, the present invention is not limited to the aspherical polynomials form shown in the condition (1).

Table 3 and table 4 show the inflexion points and the arrest point design data of the camera optical lens 10 lens in embodiment 1 of the present invention. In which, P1R1 and P1R2 represent respectively the object side surface and image side surface of the first lens L1, P2R1 and P2R2 represent respectively the object side surface and image side surface of the second lens L2, P3R1 and P3R2 represent respectively the object side surface and image side surface of the third lens L3, P4R1 and P4R2 represent respectively the object side surface and image side surface of the fourth lens L4, P5R1 and P5R2 represent respectively the object side surface and image side surface of the fifth lens L5, P6R1 and P6R2 represent respectively the object side surface and image side surface of the sixth lens L6. The data in the column named "inflexion point position" are the vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 4

| | Arrest point number | Arrest point position 1 |
|---|---|---|
| P1R1 | 0 | |
| P1R2 | 0 | |
| P2R1 | 0 | |
| P2R2 | 1 | 0.985 |
| P3R1 | 0 | |
| P3R2 | 1 | 0.895 |
| P4R1 | 1 | 0.655 |
| P4R2 | 0 | |
| P5R1 | 1 | 0.755 |
| P5R2 | 1 | 2.225 |
| P6R1 | 0 | |
| P6R2 | 1 | 1.465 |

Figure 2:
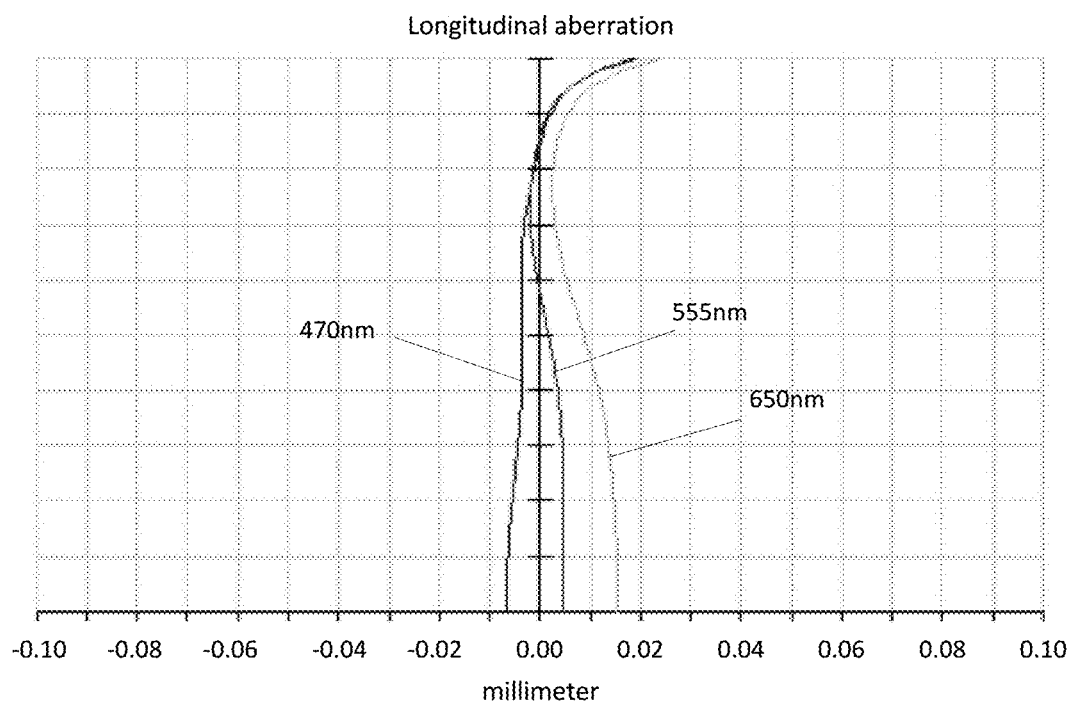
FIG. 2 shows the longitudinal aberration of the camera optical lens shown in FIG. 1.
Figure 3:
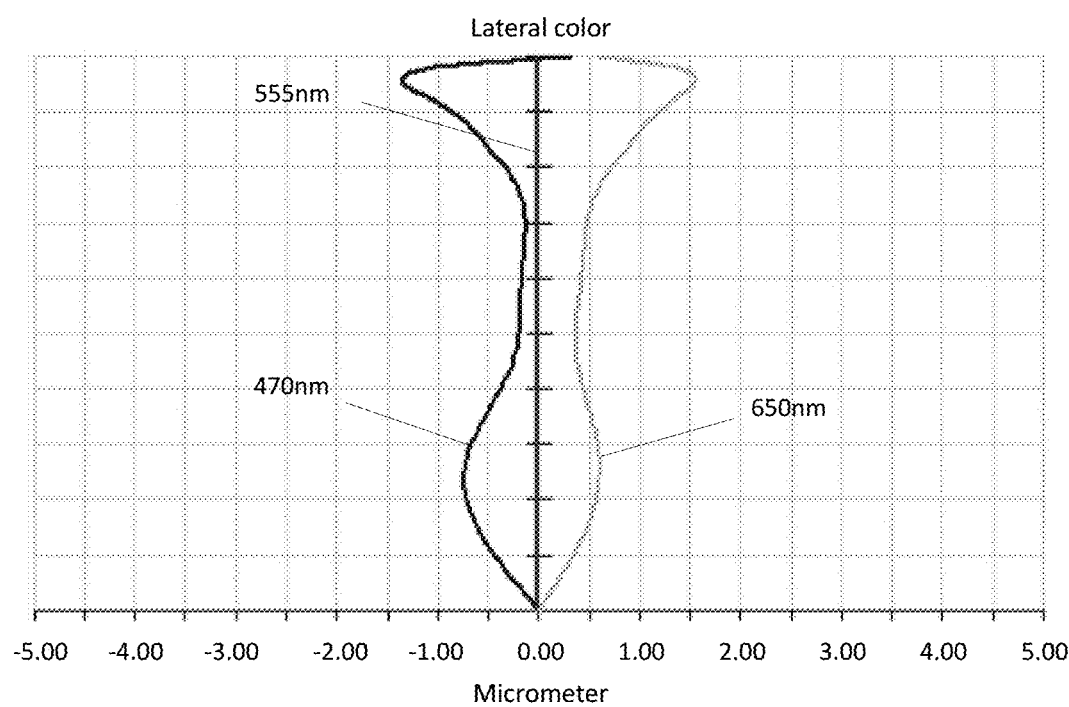
FIG. 3 shows the lateral color of the camera optical lens shown in FIG. 1.
Figure 4:
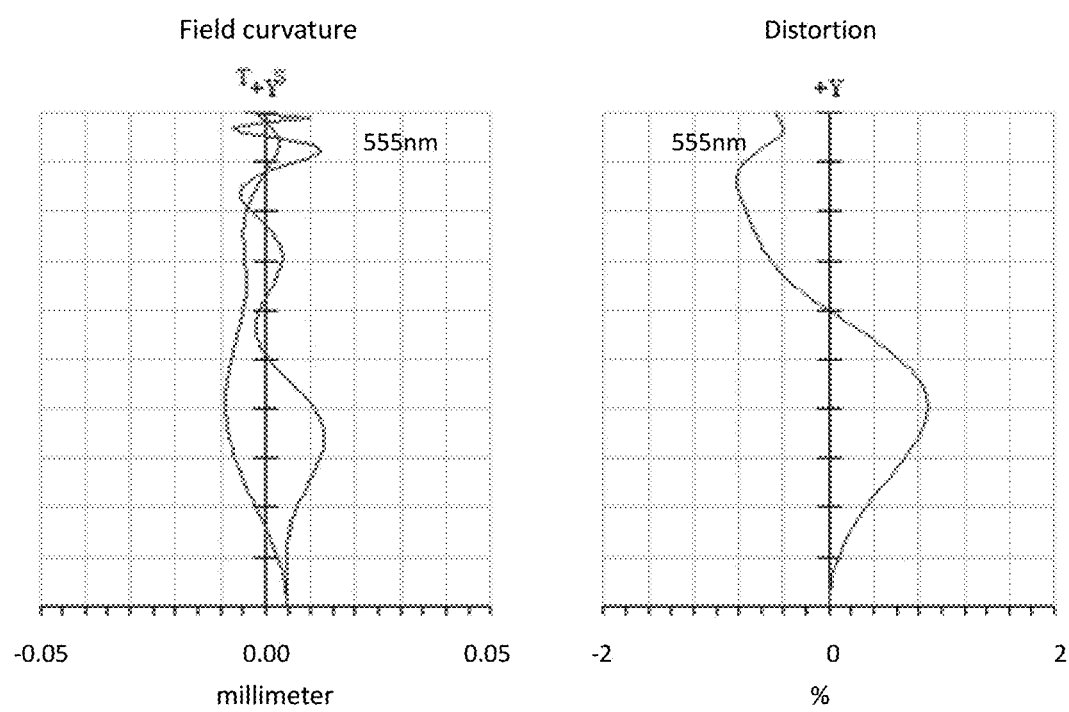
FIG. 4 presents a schematic diagram of the field curvature and distortion of the camera optical lens shown in FIG. 1.
Figure 5:
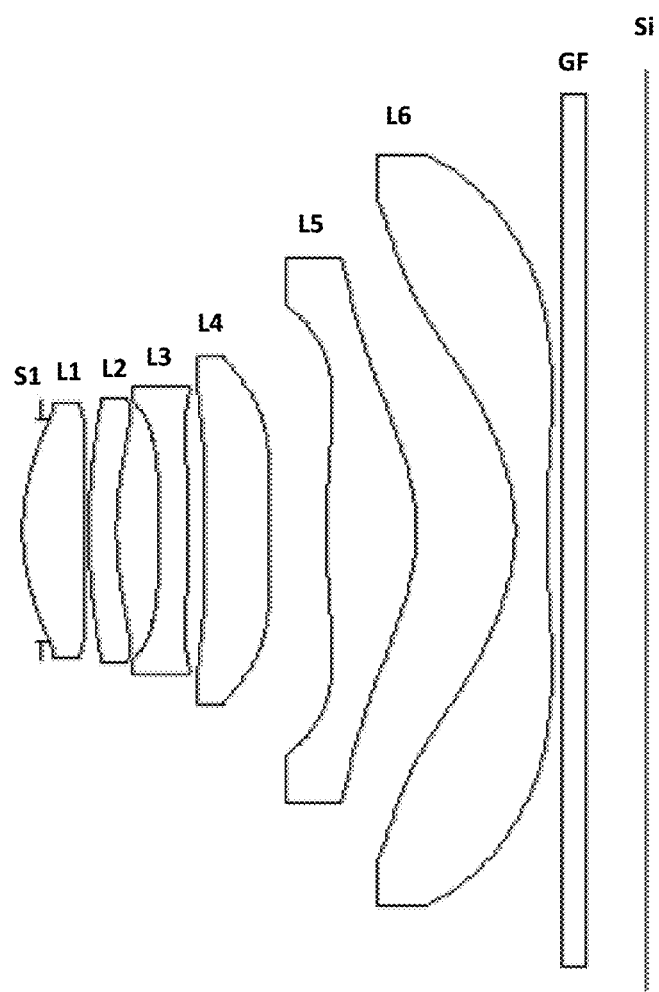
FIG. 5 is a schematic diagram of a camera optical lens in accordance with a second embodiment of the present invention.

FIG. 2 and FIG. 3 show the longitudinal aberration and lateral color schematic diagrams after light with a wavelength of 470 nm, 555 nm and 650 nm passes the camera optical lens 10 in the first embodiment. FIG. 4 shows the field curvature and distortion schematic diagrams after light with a wavelength of 555 nm passes the camera optical lens 10 in the first embodiment, the field curvature S in FIG. 4 is a field curvature in the sagittal direction, T is a field curvature in the meridian direction.

Table 13 shows the various values of the embodiments 1, 2, 3 and the values corresponding with the parameters which are already specified in the conditions.

As shown in Table 13, the first embodiment satisfies the various conditions.

In this embodiment, the pupil entering diameter of the camera optical lens is 1.852 mm, the full vision field image height is 3.918 mm, the vision field angle in the diagonal direction is 88.36°, it has wide-angle and is ultra-thin, its on-axis and off-axis chromatic aberrations are fully corrected, and it has excellent optical characteristics.

Embodiment 2

Embodiment 2 is basically the same as embodiment 1, the meaning of its symbols is the same as that of embodiment 1, in the following, only the differences are described.

Table 5 and table 6 show the design data of the camera optical lens 20 in embodiment 2 of the present invention.

TABLE 5

|  | R | d | nd | vd |
|---|---|---|---|---|
| S1 | ∞ | d0= −0.160 | | |
| R1 | 2.029 | d1= 0.514 | nd1 1.5449 | v1 55.93 |
| R2 | 62.172 | d2= 0.037 | | |
| R3 | 5.240 | d3= 0.230 | nd2 1.6713 | v2 19.24 |
| R4 | 3.079 | d4= 0.360 | | |
| R5 | −7.143 | d5= 0.230 | nd3 1.6713 | v3 19.24 |
| R6 | −18.194 | d6= 0.138 | | |
| R7 | 14.367 | d7= 0.549 | nd4 1.5352 | v4 56.09 |
| R8 | 20.081 | d8= 0.473 | | |
| R9 | 6.575 | d9= 0.747 | nd5 1.5352 | v5 56.09 |
| R10 | −1.919 | d10= 0.827 | | |
| R11 | −1.757 | d11= 0.265 | nd6 1.7130 | v6 53.87 |
| R12 | 7.574 | d12= 0.120 | | |
| R13 | ∞ | d13= 0.210 | ndg 1.5168 | vg 64.17 |
| R14 | ∞ | d14= 0.500 | | |

Table 6 shows the aspherical surface data of each lens of the camera optical lens 20 in embodiment 2 of the present invention.

TABLE 6

| | Conic Index | Aspherical Surface Index | | | | | | |
|---|---|---|---|---|---|---|---|---|
| | k | A4 | A6 | A8 | A10 | A12 | A14 | A16 |
| R1 | 1.2006E−02 | −3.4970E−03 | 5.1692E−03 | −2.7985E−02 | 9.8246E−03 | 7.2165E−03 | −1.1712E−02 | 0.0000E+00 |
| R2 | 0.0000E+00 | 8.0358E−03 | −3.4278E−02 | 4.6602E−04 | 2.1293E−03 | −4.6736E−04 | −6.4873E−03 | 1.5516E−03 |
| R3 | 1.2638E+00 | −8.8117E−03 | −2.0404E−02 | 9.8613E−03 | 7.5423E−03 | −1.7573E−03 | −1.5888E−03 | 8.1622E−04 |
| R4 | −4.7891E−01 | −2.9926E−02 | −8.1017E−03 | −1.0504E−02 | −3.5001E−03 | 1.4912E−03 | 2.1957E−03 | −5.2858E−03 |
| R5 | 1.1409E+01 | −1.7915E−02 | −2.5874E−02 | −1.2351E−02 | −6.3838E−03 | −4.6008E−03 | −1.2412E−03 | 2.1827E−03 |
| R6 | 4.6805E+01 | −9.3181E−03 | 1.4818E−02 | 8.1113E−03 | 5.8236E−04 | 1.8236E−04 | −7.7614E−05 | −2.6547E−05 |
| R7 | −2.1198E+02 | −9.7002E−02 | 3.9536E−02 | −2.4091E−03 | 4.7644E−05 | 1.2045E−05 | −9.1181E−05 | −3.0584E−04 |
| R8 | −3.3159E+02 | −1.0620E−01 | 9.7779E−03 | −4.3593E−03 | 1.1878E−03 | −7.0723E−04 | 2.5565E−05 | 1.8426E−04 |
| R9 | −1.8502E+01 | −2.5244E−02 | 4.1492E−03 | −3.2976E−03 | 1.9078E−04 | −9.6814E−06 | 5.7537E−06 | 1.1619E−06 |
| R10 | −4.7907E−01 | 4.8796E−02 | 2.2871E−03 | −1.7330E−03 | 2.1211E−04 | 2.3216E−05 | −6.5303E−06 | 3.9098E−07 |
| R11 | −4.8461E+00 | −3.5841E−02 | 6.7676E−03 | 1.3398E−04 | −6.1470E−05 | −4.4054E−06 | 8.1618E−07 | −2.0671E−08 |
| R12 | 4.3821E+00 | −3.2287E−02 | 3.7379E−03 | −2.7684E−04 | 2.7675E−06 | −3.9083E−06 | 8.5122E−07 | −4.5867E−08 |

Table 7 and table 8 show the inflexion points and the arrest point design data of the camera optical lens 20 lens in embodiment 2 of the present invention.

TABLE 7

| | Inflexion point number | Inflexion point position 1 | Inflexion point position 2 | Inflexion point position 3 |
|---|---|---|---|---|
| P1R1 | 1 | 0.915 | | |
| P1R2 | 1 | 0.435 | | |
| P2R1 | 0 | | | |
| P2R2 | 1 | 0.715 | | |
| P3R1 | 0 | | | |
| P3R2 | 1 | 0.645 | | |
| P4R1 | 2 | 0.245 | 1.015 | |
| P4R2 | 2 | 0.195 | 1.375 | |
| P5R1 | 1 | 0.655 | | |

TABLE 7-continued

| | Inflexion point number | Inflexion point position 1 | Inflexion point position 2 | Inflexion point position 3 |
|---|---|---|---|---|
| P5R2 | 2 | 1.115 | 2.085 | |
| P6R1 | 3 | 1.585 | 2.535 | 2.795 |
| P6R2 | 2 | 0.645 | 3.195 | |

TABLE 8

| | Arrest point number | Arrest point position 1 |
|---|---|---|
| P1R1 | 0 | |
| P1R2 | 1 | 0.605 |
| P2R1 | 0 | |
| P2R2 | 1 | 1.005 |
| P3R1 | 0 | |
| P3R2 | 1 | 0.885 |
| P4R1 | 1 | 0.435 |
| P4R2 | 1 | 0.335 |
| P5R1 | 1 | 1.085 |
| P5R2 | 0 | |
| P6R1 | 0 | |
| P6R2 | 1 | 1.175 |

Figure 6:
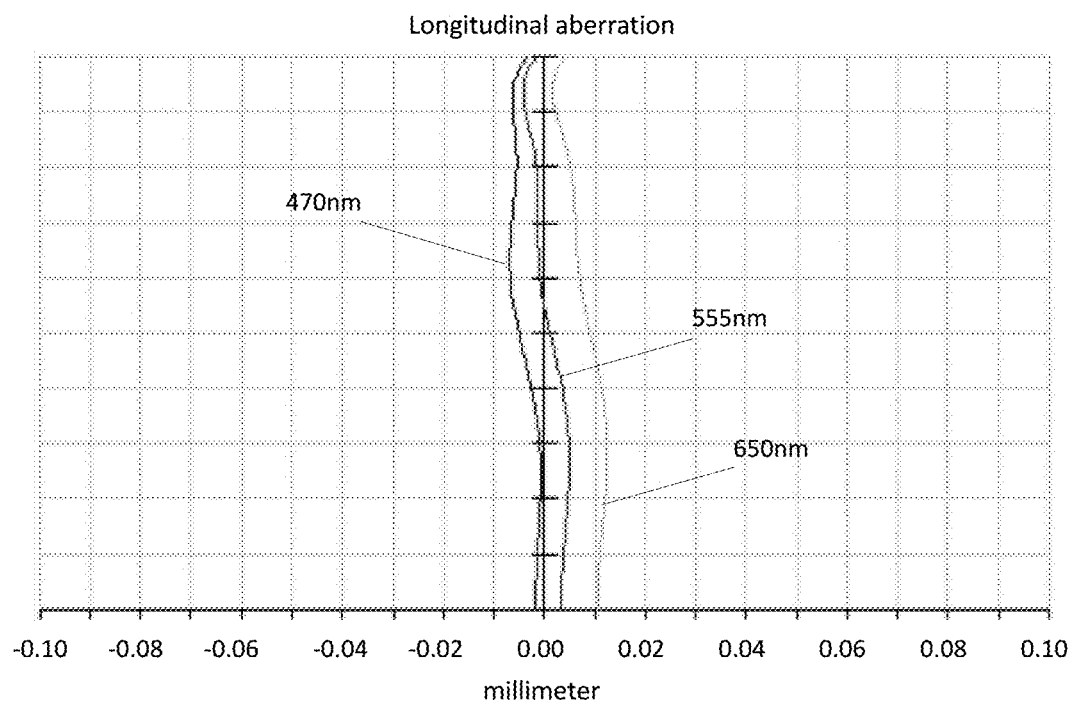
FIG. 6 presents the longitudinal aberration of the camera optical lens shown in FIG. 5.
Figure 7:
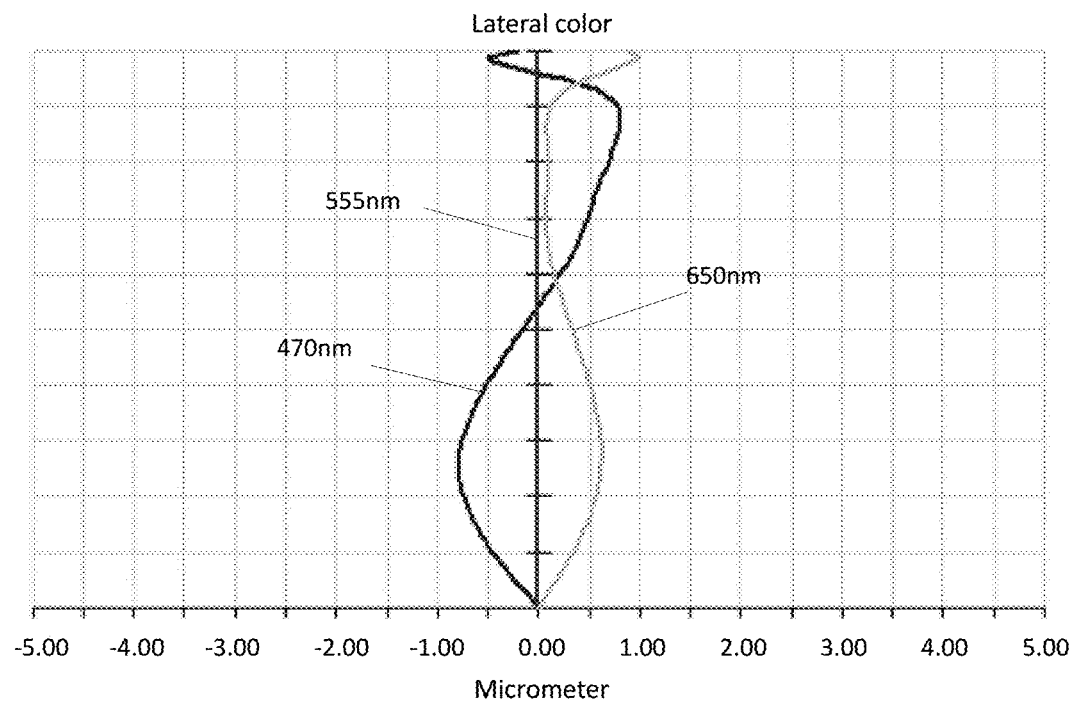
FIG. 7 presents the lateral color of the camera optical lens shown in FIG. 5.
Figure 8:
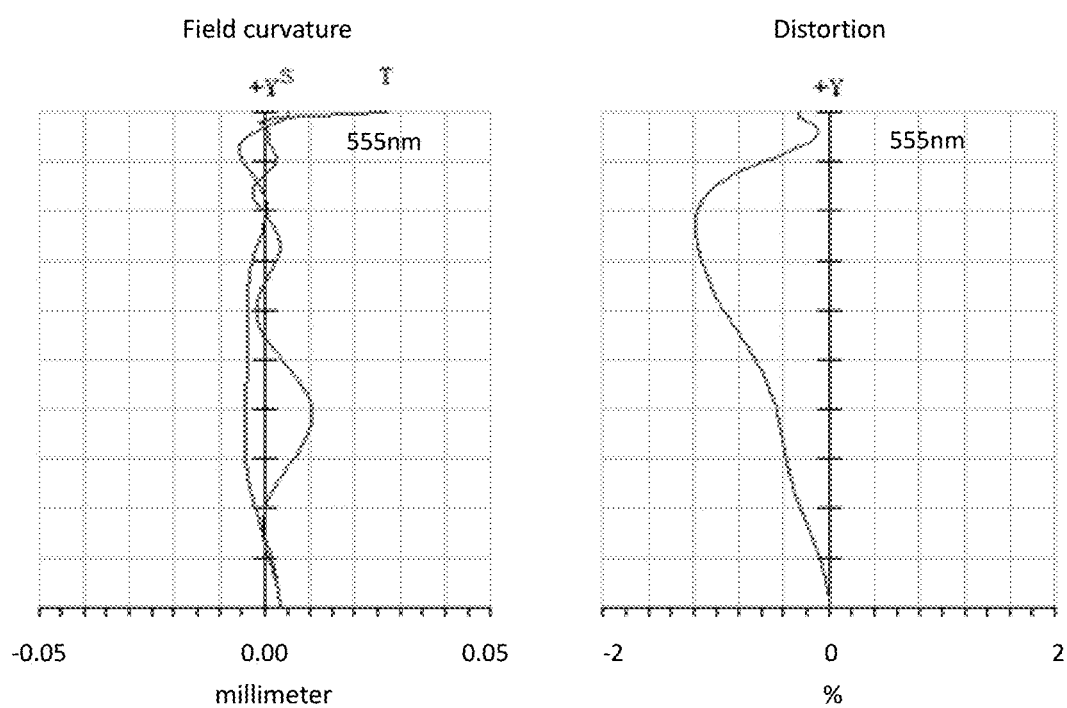
FIG. 8 presents the field curvature and distortion of the camera optical lens shown in FIG. 5.
Figure 9:
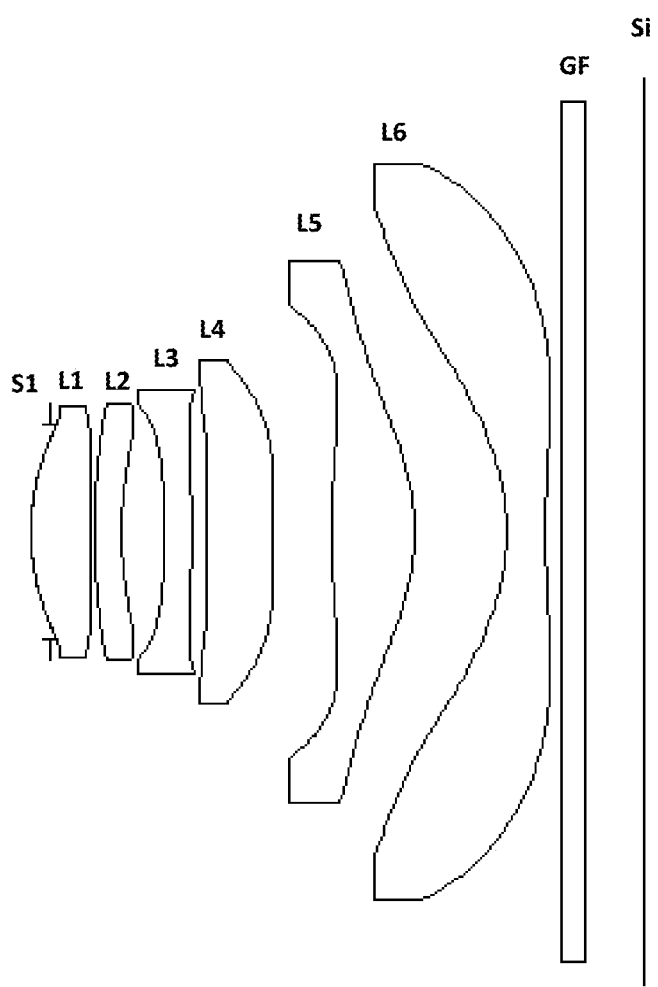
FIG. 9 is a schematic diagram of a camera optical lens in accordance with a third embodiment of the present invention.

FIG. 6 and FIG. 7 show the longitudinal aberration and lateral color schematic diagrams after light with a wavelength of 470 nm, 555 nm and 650 nm passes the camera optical lens 20 in the second embodiment. FIG. 8 shows the field curvature and distortion schematic diagrams after light with a wavelength of 555 nm passes the camera optical lens 20 in the second embodiment.

As shown in Table 13, the second embodiment satisfies the various conditions.

In this embodiment, the pupil entering diameter of the camera optical lens is 1.897 mm, the full vision field image height is 3.918 mm, the vision field angle in the diagonal direction is 86.60°, it has wide-angle and is ultra-thin, its on-axis and off-axis chromatic aberrations are fully corrected, and it has excellent optical characteristics.

Embodiment 3

Embodiment 3 is basically the same as embodiment 1, the meaning of its symbols is the same as that of embodiment 1, in the following, only the differences are described.

Table 9 and table 10 show the design data of the camera optical lens 30 in embodiment 3 of the present invention.

TABLE 9

| | R | d | nd | vd |
|---|---|---|---|---|
| S1 | ∞ | d0= −0.160 | | |
| R1 | 2.031 | d1= 0.503 | nd1 1.5449 | v1 55.93 |
| R2 | 80.665 | d2= 0.037 | | |
| R3 | 5.582 | d3= 0.230 | nd2 1.6713 | v2 19.24 |
| R4 | 3.188 | d4= 0.363 | | |
| R5 | −6.971 | d5= 0.229 | nd3 1.6713 | v3 19.24 |
| R6 | −17.921 | d6= 0.134 | | |
| R7 | 16.689 | d7= 0.562 | nd4 1.5352 | v4 56.09 |
| R8 | 35.136 | d8= 0.491 | | |
| R9 | 5.909 | d9= 0.711 | nd5 1.5352 | v5 56.09 |
| R10 | −1.917 | d10= 0.777 | | |
| R11 | −1.971 | d11= 0.328 | nd6 1.8040 | v6 46.58 |
| R12 | 7.576 | d12= 0.126 | | |
| R13 | ∞ | d13= 0.210 | ndg 1.5168 | vg 64.17 |
| R14 | ∞ | d14= 0.500 | | |

Table 10 shows the aspherical surface data of each lens of the camera optical lens 30 in embodiment 3 of the present invention.

TABLE 10

| | Conic Index | Aspherical Surface Index | | | | | | |
|---|---|---|---|---|---|---|---|---|
| | k | A4 | A6 | A8 | A10 | A12 | A14 | A16 |
| R1 | 1.0959E−02 | −3.7039E−03 | 5.5834E−03 | −2.7709E−02 | 9.1911E−03 | 6.6053E−03 | −1.1645E−02 | −2.8609E−05 |
| R2 | −1.0000E+02 | 7.8039E−03 | −3.4116E−02 | 1.2873E−02 | 2.6434E−03 | −3.4823E−04 | −6.6641E−03 | 1.5042E−03 |
| R3 | 4.5147E−01 | −8.9223E−03 | −2.0204E−02 | 1.0163E−02 | 8.3050E−03 | −1.0489E−03 | −1.1440E−03 | 8.9696E−04 |
| R4 | −5.8074E−01 | −3.0456E−02 | −8.6703E−03 | −1.0463E−02 | −3.3967E−03 | 1.4080E−03 | 2.3020E−03 | −5.0767E−03 |
| R5 | 1.3441E+01 | −1.8807E−02 | −2.5967E−02 | −1.1407E−02 | −5.9004E−03 | −4.9103E−03 | −1.6747E−03 | 1.3521E−03 |
| R6 | 5.5424E+01 | −9.7156E−02 | 1.4626E−02 | 7.9262E−03 | 5.2764E−04 | 1.2175E−04 | −6.9557E−05 | 1.1362E−07 |
| R7 | −1.3467E+02 | −9.7050E−02 | 3.9436E−02 | −2.3834E−03 | 4.4867E−05 | 1.2200E−03 | −9.1556E−05 | −3.0864E−04 |
| R8 | 0.0000E+00 | −1.0778E−01 | 1.0524E−02 | −4.1208E−03 | 1.2507E−03 | −6.9794E−04 | 2.4273E−05 | 1.8234E−04 |
| R9 | −2.1079E+01 | −2.4932E−02 | 4.8207E−03 | −3.1934E−03 | 1.8418E−04 | −1.3850E−05 | 4.8673E−06 | 1.0693E−06 |
| R10 | −4.8003E−01 | 4.9066E−02 | 2.2893E−02 | −1.7362E−03 | 2.1161E−04 | 2.3158E−05 | −6.5355E−06 | 3.9083E−07 |
| R11 | −5.5071E+00 | −3.6883E−02 | 6.7403E−03 | 1.3351E−03 | −6.1482E−05 | −4.4109E−06 | 8.1518E−07 | −2.0833E−08 |
| R12 | 4.3984E+00 | −3.3089E−02 | 3.7666E−03 | −2.7505E−04 | 2.7740E−06 | −3.9197E−06 | 8.4996E−07 | −4.5951E−08 |

Table 11 and table 12 show the inflexion points and the arrest point design data of the camera optical lens 30 lens in embodiment 3 of the present invention.

TABLE 11

| | Inflexion point number | Inflexion point position 1 | Inflexion point position 2 | Inflexion point position 3 |
|---|---|---|---|---|
| P1R1 | 1 | 0.905 | | |
| P1R2 | 1 | 0.415 | | |
| P2R1 | 0 | | | |
| P2R2 | 1 | 0.705 | | |
| P3R1 | 0 | | | |
| P3R2 | 1 | 0.655 | | |
| P4R1 | 3 | 0.235 | 1.005 | 1.285 |
| P4R2 | 2 | 0.155 | 1.365 | |
| P5R1 | 1 | 0.675 | | |
| P5R2 | 2 | 1.115 | 2.065 | |
| P6R1 | 2 | 1.615 | 2.475 | |
| P6R2 | 2 | 0.635 | 3.915 | |

TABLE 12

| | Arrest point number | Arrest point position 1 |
|---|---|---|
| P1R1 | 0 | |
| P1R2 | 1 | 0.585 |
| P2R1 | 0 | |
| P2R2 | 1 | 0.995 |
| P3R1 | 0 | |

TABLE 12-continued

| | Arrest point number | Arrest point position 1 |
|---|---|---|
| P3R2 | 1 | 0.895 |
| P4R1 | 1 | 0.405 |
| P4R2 | 1 | 0.255 |
| P5R1 | 1 | 1.125 |
| P5R2 | 0 | |
| P6R1 | 0 | |
| P6R2 | 1 | 1.155 |

Figure 10:
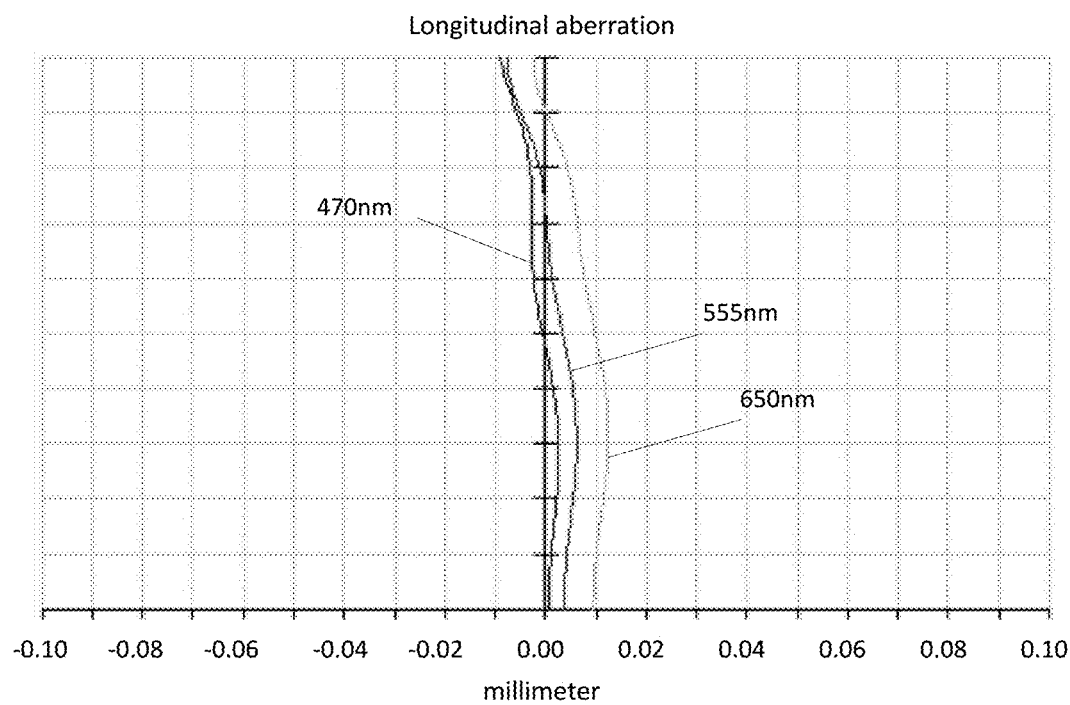
FIG. 10 presents the longitudinal aberration of the camera optical lens shown in FIG. 9.
Figure 11:
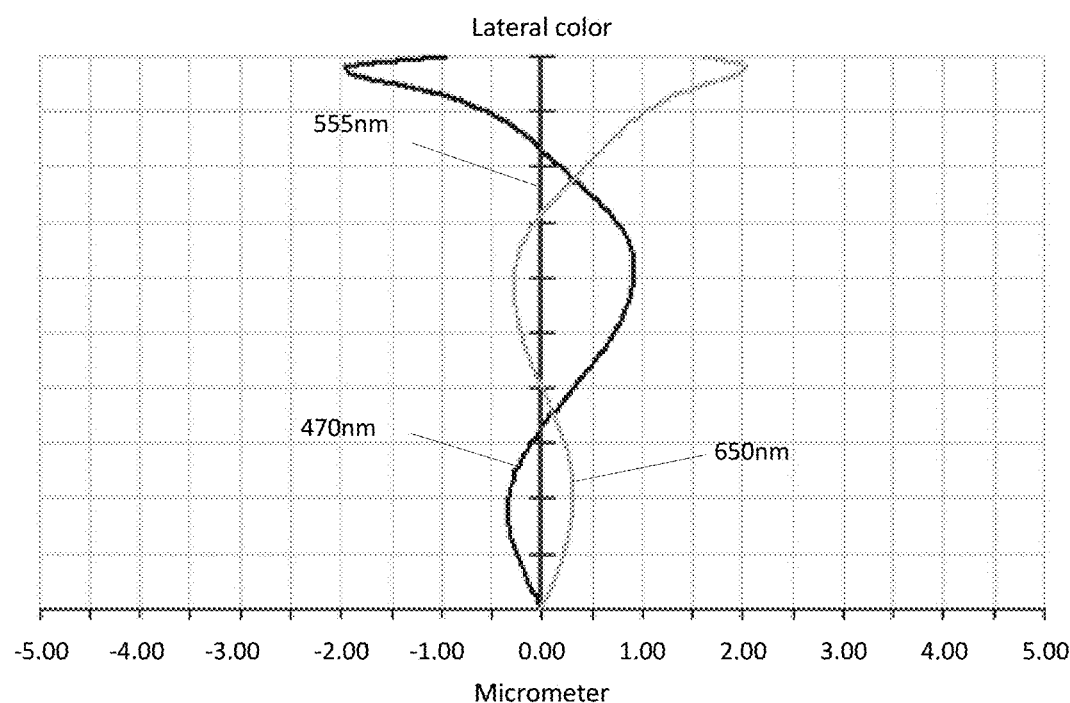
FIG. 11 presents the lateral color of the camera optical lens shown in FIG. 9.
Figure 12:
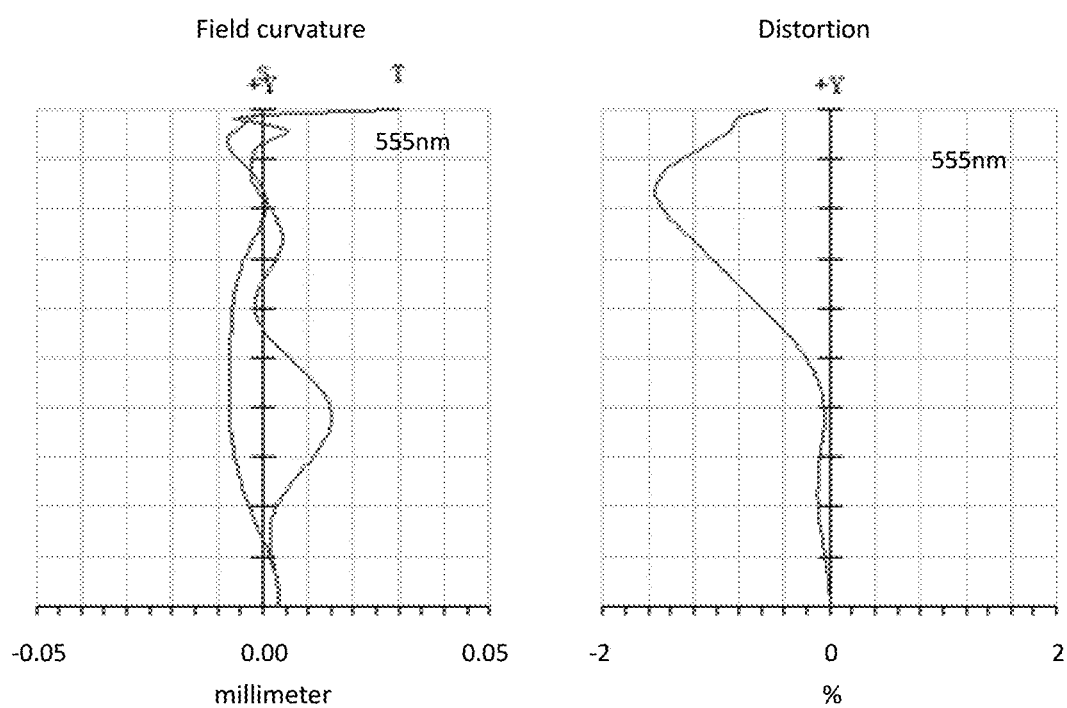
FIG. 12 presents the field curvature and distortion of the camera optical lens shown in FIG. 9.

FIG. 10 and FIG. 11 show the longitudinal aberration and lateral color schematic diagrams after light with a wavelength of 470 nm, 555 nm and 650 nm passes the camera optical lens 30 in the third embodiment. FIG. 12 shows the field curvature and distortion schematic diagrams after light with a wavelength of 555 nm passes the camera optical lens 30 in the third embodiment.

As shown in Table 13, the third embodiment satisfies the various conditions.

In this embodiment, the pupil entering diameter of the camera optical lens is 1.886 mm, the full vision field image height is 3.918 mm, the vision field angle in the diagonal direction is 87.12°, it has wide-angle and is ultra-thin, its on-axis and off-axis chromatic aberrations are fully corrected, and it has excellent optical characteristics.

TABLE 13

| | Embodiment 1 | Embodiment 2 | Embodiment 3 |
|---|---|---|---|
| f | 4.058 | 4.174 | 4.149 |
| f1 | 5.058 | 3.826 | 3.802 |
| f2 | −45.341 | −11.508 | −11.412 |
| f3 | −9.114 | −17.504 | −16.982 |
| f4 | 8.667 | 90.990 | 58.578 |
| f5 | 2.766 | 2.855 | 2.784 |
| f6 | −1.914 | −1.970 | −1.909 |
| f12 | 5.446 | 5.236 | 5.220 |
| (R1 + R2)/(R1 − R2) | −1.850 | −1.067 | −1.052 |
| (R3 + R4)/(R3 − R4) | 15.667 | 3.848 | 3.663 |
| (R5 + R6)/(R5 − R6) | −1.850 | −2.293 | −2.273 |
| (R7 + R8)/(R7 − R8) | −0.481 | −6.029 | −2.809 |
| (R9 + R10)/(R9 − R10) | 0.749 | 0.548 | 0.510 |
| (R11 + R12)/(R11 − R12) | −0.391 | −0.623 | −0.587 |
| f1/f | 1.247 | 0.917 | 0.916 |
| f2/f | −11.175 | −2.757 | −2.751 |
| f3/f | −2.246 | −4.193 | −4.093 |
| f4/f | 2.136 | 21.798 | 14.120 |
| f5/f | 0.682 | 0.684 | 0.671 |
| f6/f | −0.472 | −0.472 | −0.460 |
| f12/f | 1.342 | 1.254 | 1.258 |
| d1 | 0.433 | 0.514 | 0.503 |

TABLE 13-continued

|     | Embodiment 1 | Embodiment 2 | Embodiment 3 |
|-----|---------|---------|---------|
| d3  | 0.219   | 0.230   | 0.230   |
| d5  | 0.210   | 0.230   | 0.229   |
| d7  | 0.467   | 0.549   | 0.562   |
| d9  | 0.762   | 0.747   | 0.711   |
| d11 | 0.393   | 0.265   | 0.328   |
| Fno | 2.191   | 2.200   | 2.200   |
| TTL | 5.201   | 5.201   | 5.201   |
| d1/TTL  | 0.083 | 0.099 | 0.097 |
| d3/TTL  | 0.042 | 0.044 | 0.044 |
| d5/TTL  | 0.040 | 0.044 | 0.044 |
| d7/TTL  | 0.090 | 0.106 | 0.108 |
| d9/TTL  | 0.146 | 0.144 | 0.137 |
| d11/TTL | 0.076 | 0.051 | 0.063 |
| n1  | 1.5449  | 1.5449  | 1.5449  |
| n2  | 1.6713  | 1.6713  | 1.6713  |
| n3  | 1.6713  | 1.6713  | 1.6713  |
| n4  | 1.5352  | 1.5352  | 1.5352  |
| n5  | 1.5352  | 1.5352  | 1.5352  |
| n6  | 1.7292  | 1.7130  | 1.8040  |
| v1  | 55.9299 | 55.9299 | 55.9299 |
| v2  | 19.2429 | 19.2429 | 19.2429 |
| v3  | 19.2429 | 19.2429 | 19.2429 |
| v4  | 56.0934 | 56.0934 | 56.0934 |
| v5  | 56.0934 | 56.0934 | 56.0934 |
| v6  | 54.6800 | 53.8671 | 46.5834 |
| f5/f6 | -1.4453 | -1.4487 | -1.4584 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens, a second lens, a third lens, a fourth lens, a fifth lens, and a sixth lens;
wherein the camera optical lens consists of six lenses, and further satisfies the following conditions:

$$0.1 \leq f1/f \leq 5;$$

where
f: the focal length of the camera optical lens;
f1: the focal length of the first lens;
f2: the focal length of the second lens;
n6: the refractive index of the sixth lens;
d11: the thickness on-axis of the sixth lens;
TTL: the total optical length of the camera optical lens.

2. The camera optical lens as described in claim 1, wherein the first lens is made of plastic material, the second lens is made of plastic material, the third lens is made of plastic material, the fourth lens is made of plastic material, the fifth lens is made of plastic material, the sixth lens is made of glass material.

3. The camera optical lens as described in claim 1 further satisfying the following conditions:

$$0.508 \leq f1/f \leq 3.123;$$

$$1.706 \leq n6 \leq 2.0;$$

$$0.04 \leq d11/TTL \leq 0.113.$$

4. The camera optical lens as described in claim 1, wherein first lens has a positive refractive power with a convex object side surface and a concave image side surface; the camera optical lens further satisfies the following conditions:

$$-3.70 \leq (R1+R2)/(R1-R2) \leq -0.70;$$

$$0.22 \text{ mm} \leq d1 \leq 0.77 \text{ mm}; \text{ where}$$

R1: the curvature radius of object side surface of the first lens;
R2: the curvature radius of image side surface of the first lens;
d1: the thickness on-axis of the first lens.

5. The camera optical lens as described in claim 4 further satisfying the following conditions:

$$-2.31 \leq (R1+R2)/(R1-R2) \leq -0.88;$$

$$0.35 \text{ mm} \leq d1 \leq 0.62 \text{ mm}.$$

6. The camera optical lens as described in claim 1, wherein the second lens has a negative refractive power with a convex object side surface and a concave image side surface; the camera optical lens further satisfies the following conditions:

$$1.83 \leq (R3+R4)/(R3-R4) \leq 23.50;$$

$$0.11 \text{ mm} \leq d3 \leq 0.35 \text{ mm}; \text{ where}$$

R3: the curvature radius of the object side surface of the second lens;
R4: the curvature radius of the image side surface of the second lens;
d3: the thickness on-axis of the second lens.

7. The camera optical lens as described in claim 6 further satisfying the following conditions:

$$-13.97 \leq f2/f \leq 2.751;$$

$$2.93 \leq (R3+R4)/(R3-R4) \leq 18.80;$$

$$0.18 \text{ mm} \leq d3 \leq 0.28 \text{ mm}.$$

8. The camera optical lens as described in claim 1, wherein the third lens has a negative refractive power with a concave object side surface and a convex image side surface; the camera optical lens further satisfies the following conditions:

$$-8.39 \leq f3/f \leq -1.50;$$

$$-4.59 \leq (R5+R6)/(R5-R6) \leq -1.23;$$

$$0.11 \text{ mm} \leq d5 \leq 0.35 \text{ mm}; \text{ where}$$

f: the focal length of the camera optical lens;
f3: the focal length of the third lens;
R5: the curvature radius of the object side surface of the third lens;
R6: the curvature radius of the image side surface of the third lens;
d5: the thickness on-axis of the third lens.

9. The camera optical lens as described in claim 8 further satisfying the following conditions:

$$-5.24 \leq f3/f5 \leq -1.87;$$

$$-2.87 \leq (R5+R6)/(R5-R6) \leq -1.54;$$

$$0.17 \text{ mm} \leq d5 \leq 0.28 \text{ mm}.$$

10. The camera optical lens as described in claim 1, wherein the fourth lens has a positive refractive power with a convex object side surface; the camera optical lens further satisfies the following conditions:

$$1.07 \leq f4/f \leq 32.70;$$

$$-12.06 \leq (R7+R8)/(R7-R8) \leq -0.32;$$

$$0.23 \text{ mm} \leq d7 \leq 0.84 \text{ mm; where}$$

f: the focal length of the camera optical lens;
f4: the focal length of the fourth lens;
R7: the curvature radius of the object side surface of the fourth lens;
R8: the curvature radius of the image side surface of the fourth lens;
d7: the thickness on-axis of the fourth lens.

11. The camera optical lens as described in claim 10 further satisfying the following conditions:

$$1.71 \leq f4/f \leq 26.16;$$

$$-7.54 \leq (R7+R8)/(R7-R8) \leq -0.40;$$

$$0.37 \text{ mm} \leq d7 \leq 0.67 \text{ mm}.$$

12. The camera optical lens as described in claim 1, wherein the fifth lens has a positive refractive power with a convex object side surface and a convex image side surface; the camera optical lens further satisfies the following conditions:

$$0.34 \leq f5/f \leq 1.03;$$

$$0.26 \leq (R9+R10)/(R9-R10) \leq 1.12;$$

$$0.36 \text{ mm} \leq d9 \leq 1.14 \text{ mm; where}$$

f: the focal length of the camera optical lens;
f5: the focal length of the fifth lens;
R9: the curvature radius of the object side surface of the fifth lens;
R10: the curvature radius of the image side surface of the fifth lens;
d9: the thickness on-axis of the fifth lens.

13. The camera optical lens as described in claim 12 further satisfying the following conditions:

$$0.54 \leq f5/f \leq 0.82;$$

$$0.41 \leq (R9+R10)/(R9-R10) \leq 0.90;$$

$$0.57 \text{ mm} \leq d9 \leq 0.91 \text{ mm}.$$

14. The camera optical lens as described in claim 1, wherein the sixth lens has a negative refractive power with a concave object side surface and a concave image side surface; the camera optical lens further satisfies the following conditions:

$$-0.94 \leq f6/f \leq -0.31;$$

$$-1.25 \leq (R11+R12)/(R11-R12) \leq -0.26;$$

$$0.13 \text{ mm} \leq d11 \leq 0.59 \text{ mm; where}$$

f: the focal length of the camera optical lens;
f6: the focal length of the sixth lens;
R11: the curvature radius of the object side surface of the sixth lens;
R12: the curvature radius of the image side surface of the sixth lens;
d11: the thickness on-axis of the sixth lens.

15. The camera optical lens as described in claim 14 further satisfying the following conditions:

$$-0.59 \leq f6/f \leq -0.38;$$

$$-0.78 \leq (R11+R12)/(R11-R12) \leq -0.33;$$

$$0.21 \text{ mm} \leq d11 \leq 0.47 \text{ mm}.$$

16. The camera optical lens as described in claim 1 further satisfying the following condition:

$$0.63 \leq f12/f \leq 2.01; \text{ where}$$

f12: the combined focal length of the first lens and the second lens;
f: the focal length of the camera optical lens.

17. The camera optical lens as described in claim 16 further satisfying the following conditions:

$$1.00 \leq f12/f \leq 1.61.$$

18. The camera optical lens as described in claim 1, wherein the total optical length TTL of the camera optical lens is less than or equal to 5.72 mm.

19. The camera optical lens as described in claim 18, wherein the total optical length TTL of the camera optical lens is less than or equal to 5.46 mm.

20. The camera optical lens as described in claim 1, wherein the aperture F number of the camera optical lens is less than or equal to 2.27.

21. The camera optical lens as described in claim 20, wherein the aperture F number of the camera optical lens is less than or equal to 2.22.

* * * * *